(12) United States Patent
Lery et al.

(10) Patent No.: US 11,014,667 B2
(45) Date of Patent: May 25, 2021

(54) RAIL VEHICLE AND ON-BOARD SAFETY DRONE

(71) Applicant: Bombardier Transportation GmbH, Berlin (DE)

(72) Inventors: Benoît Lery, Bangkok (TH); Teerawat Chongrattanameteekul, Bangkok (TH); Stephane Goulet, Laval (CA); Randula Hettiarachchi, Bangkok (TH); Danny Higgins, St-Basile-le Grand (CA); Carl Lavertu, Beloeil (CA); Benjamaporn Lertwiriyapiti, Sarabun (TH)

(73) Assignee: Bombardier Transportation GmbH, Berlin (DE)

( * ) Notice: Subject to any disclaimer, the term of this patent is extended or adjusted under 35 U.S.C. 154(b) by 412 days.

(21) Appl. No.: 15/936,663

(22) Filed: Mar. 27, 2018

(65) Prior Publication Data
US 2019/0112046 A1 Apr. 18, 2019

Related U.S. Application Data

(60) Provisional application No. 62/573,817, filed on Oct. 18, 2017.

(51) Int. Cl.
*B64C 39/02* (2006.01)
*B61B 13/10* (2006.01)
(Continued)

(52) U.S. Cl.
CPC ............ *B64C 39/024* (2013.01); *B61B 13/10* (2013.01); *B61L 15/0081* (2013.01); *B61L 23/04* (2013.01);
(Continued)

(58) Field of Classification Search
CPC ..... B61B 13/10; B61K 13/00; B61L 15/0081; B61L 23/04; B64D 47/08; G08B 25/016; G08B 7/066; Y02T 30/40
See application file for complete search history.

(56) References Cited

U.S. PATENT DOCUMENTS 9,407,306 B2 * 8/2016 Yang .................. H04B 1/38
2015/0009331 A1 * 1/2015 Venkatraman ........ B61L 23/041
348/148

(Continued)

FOREIGN PATENT DOCUMENTS

CN 106954042 7/2017
KR 101794198 B1 11/2017
(Continued)

*Primary Examiner* — Peter D Nolan
*Assistant Examiner* — Ce Li Li
(74) *Attorney, Agent, or Firm* — The Webb Law Firm

(57) ABSTRACT

A method for evaluating damage and providing passenger assistance in emergency events involving mass transit vehicles (MTVs), especially emergency events occurring in a tunnel, includes: (a) providing, on-board the MTV, at least one unmanned aerial vehicle (UAV), each UAV including a controller comprising a processor and memory; (b) determining, by the controller of the UVA while on-board the MTV in the tunnel, a change in at least one of the following: an acceleration, positive or negative, greater than a predetermined acceleration, an angle greater than a predetermined angle, a temperature greater than a predetermined temperature, and the presence of particles, gas or both greater than a predetermined concentration; (c) in response to the determining in step (b), the UAV separating from the MTV and becoming airborne within the tunnel; and (d) following step (c), executing, by the UAV, flight movement of the UAV within the tunnel.

22 Claims, 5 Drawing Sheets

(51) Int. Cl.
  *B64D 47/08*  (2006.01)
  *G08B 25/01*  (2006.01)
  *G08B 7/06*  (2006.01)
  *B61L 23/04*  (2006.01)
  *B61L 15/00*  (2006.01)

(52) U.S. Cl.
  CPC ............ *B64D 47/08* (2013.01); *G08B 7/066* (2013.01); *G08B 25/016* (2013.01); *B64C 2201/024* (2013.01); *B64C 2201/12* (2013.01); *B64C 2201/141* (2013.01); *B64C 2201/208* (2013.01); *Y02T 30/00* (2013.01)

(56) References Cited

U.S. PATENT DOCUMENTS

| | | | |
|---|---|---|---|
| 2016/0054143 A1* | 2/2016 | Abuelsaad | G01C 21/365 |
| | | | 701/431 |
| 2017/0199269 A1* | 7/2017 | Allen | G01S 19/48 |
| 2017/0225781 A1* | 8/2017 | Almasoud | G08G 5/0069 |
| 2017/0255824 A1* | 9/2017 | Miller | B61L 27/0088 |
| 2017/0328683 A1* | 11/2017 | Smith | F41G 7/346 |
| 2018/0253091 A1* | 9/2018 | Pfoertzsch | G05D 1/0808 |

FOREIGN PATENT DOCUMENTS

| | | |
|---|---|---|
| WO | 2006018304 A3 | 2/2006 |
| WO | 2015123669 A1 | 8/2015 |
| WO | 2018019542 A1 | 7/2017 |

* cited by examiner

RAIL VEHICLE AND ON-BOARD SAFETY DRONE

CROSS REFERENCE TO RELATED APPLICATION

This application claims the benefit of U.S. Provisional Application No. 62/573,817, filed Oct. 18, 2017, the contents of which are incorporated in their entirety herein by reference.

BACKGROUND OF THE INVENTION

Field of the Invention

The present invention relates to providing assistance to passengers and crew of a train during an emergency event, such as a crash, derailment, force majeure (terrorist attack, earthquake, etc.) or any other type of emergency event where the train of its infrastructure is disabled and, more particularly, to providing such assistance using an unmanned aerial vehicle (UAV) autonomously, semi-autonomously, or under the control of a UAV operator.

Description of Related Art

Heretofore, in response to the occurrence of an emergency event involving a train, such as a mass transit vehicle (MTV), there is often a delay, perhaps substantial, between the occurrence of the emergency event and the arrival of first responders to aid passengers and crew. Such delays were occasioned by the need to identify the emergency event and, in response thereof, rally and dispatch the first responders to the location of the emergency event, which location can sometimes be remote or difficult to access.

The challenge of dispatching first responders to emergency events occurring in tunnels is particularly challenging because of the access to the MTV in a tunnel, namely, openings on either end of the tunnel for passage of the MTV and/or emergency accesses to the tunnel, typically formed in one or more walls of the tunnel.

It would, therefore, be desirable to provide a means located onboard the MTV that is configured to provide rapid assistance to passengers and crew of the MTV upon the occurrence of a crash event or any other urgent event, preferably well in the advance of the arrival of first responders.

SUMMARY OF THE INVENTION

Generally, provided is an improved apparatus and method for evaluating damage and providing passenger assistance in emergency situations involving mass transit vehicles (MTVs), especially emergency situations in tunnels.

According to one preferred and non-limiting embodiment, disclosed herein is a MTV, such as, for example, a mass transit vehicle (MTV), equipped with one, or two, or more unmanned aerial vehicles (UAV's), also known as drones. Each UAV can be programmed to operate autonomously, semi-autonomously, and/or manually controlled to respond to an emergency event, particularly an emergency event occurring within a tunnel. Examples of such emergency events include, without limitation: excessive acceleration (positive or negative), e.g., indicative of a crash or derailment event; an excessive angle of one or more cars of the MTV, e.g., indicative of said car(s) tipping excessively to a side, forward, or backward indicative of a crash or derailment event; a temperature in excess of a threshold temperature, e.g., indicative of a fire on or proximate to the MTV; and/or smoke (e.g., particles and/or gas) associated with an ignition event or a fire.

In one preferred and non-limiting embodiment or example, in response to detecting the emergency event (or an emergency event being detected by some external means), each UAV can separate (either autonomously or in response to a manually initiated signal) from the MTV and become airborne whereupon the UAV can execute flight movement, either autonomously, semi-autonomously, or under the control of an operator, such as, for example, an operator at an Operations Control Center (OCC) remote from the tunnel. During flight in response to an emergency event, the UAV can become the eyes and presence of a real or virtual emergency assistant or operator to evaluate and take action in response to the emergency event, such as, for example, facilitate passenger and operator evacuation from the site of the emergency event. In an example, the UAV can take action in response to the emergency event autonomously, or under the control of an operator at the OCC, or a combination thereof, i.e., semi-autonomously.

In one preferred and non-limiting embodiment or example, each UAV can separate in response to a manually initiated signal from the MTV and become airborne in response to an event not triggered by a sensor on-board the UAV. For example, each UAV can be caused to become airborne in response to the MTV stopping in response to an obstacle on the track or pathway of the MTV or in the tunnel. In this example, each airborne UAV can be caused to become airborne and can be controlled by a driver of the MTV, an operator at the OCC, or a combination thereof.

In one preferred and non-limiting embodiment or example, semi-autonomous operation of the UAV can include the UAV being programmed to autonomously detect and avoid objects during flight, thereby freeing an operator of the UAV, e.g., an operator at the OCC, to control the general operation and flight of the UAV while avoiding the possibility of UAV moving into contact with an object, such as a wall of a tunnel or debris from a crash event, not detected by the operator. In an example, the UAV can detect an object via an on-board camera, an on-board radar system, or a combination thereof, and a controller or processor of the UAV can be programmed or configured to process the output(s) of the camera and/or radar and, based on said output(s), execute a collision avoidance algorithm that can detect an object proximate to the UAV or in the flight path of the UAV and cause the UAV to automatically take action to avoid the UAV from flying into contact with the object. In an example, this automatic action can be independent of operator control of the UAV.

In one preferred and non-limiting embodiment or example, the radar system can be used when there is limited visibility in the tunnel, e.g., when there is smoke in the tunnel. In an example, the reflected radio waves output by the radar system can be received by a receiver of the radar system that can process the reflected radio waves to produce a virtual image of the UAV environment that an operator of the UAV can use for controlling flight movement(s) of the UAV and/or that the UAV can use autonomously to control its flight movement(s). This processing of the received reflected radio waves can occur by a processor of the controller of the UAV or by processor of the OCC.

In one preferred and non-limiting embodiment or example, one or more of the UAVs can self-locate, or be self-located, in an environment, such as a tunnel, via information included in or determined from wireless communications received by a wireless on-board receiver or transceiver of the UAV or the MTV. For example, it is envisioned that cellular data presently or may, in future cellular communication protocols, e.g., 5G, include information from which each UAV may self-locate itself, or be self-located, e.g., by a controller of the MTV, in an environment and this information can be used, alone or in combination with other data, e.g., camera data, radar data, and/or the like, for controlling flight movement(s) of the UAV and/or that the UAV can use autonomously to control its flight movement(s) in the environment.

In one preferred and non-limiting embodiment or example, the UAV can include one or more cameras for acquiring images of the site of the emergency event and optionally communicating said images to the OCC. The UAV can also include an audio speaker and/or a lighting system that can be used to communicate oral commands, e.g., oral commands preprogrammed into the controller of the UAV or oral commands from the OCC, to the emergency event site and provide light to guide passengers and staff to a safety location. The UAV can also include a microphone to facilitate sound communication (e.g., voice communication) between the emergency event site and the OCC.

In one preferred and non-limiting embodiment or example, the UAV can include one or more of the following: means for detecting a safe passage for passenger evacuation; means for detecting or scanning the temperature in the tunnel at or proximate to the emergency event; means for detecting unsafe levels of smoke, flammable gas, and/or carbon monoxide (CO); means for calling emergency personnel; and means for providing emergency personnel and passengers with safety instructions.

In one preferred and non-limiting embodiment or example, the means for detecting a safe passage for passenger evacuation can comprise the UAV including one or more of the following: a first camera operating in the human visual spectrum (e.g., for use in lighted conditions); a second camera operating in a spectrum other than in the human visual spectrum (e.g., in the infrared spectrum), for use in low or no visible light conditions; a radar system that outputs radio waves and receives reflected radio waves (e.g., for use by the UAV when in flight for object detection and for use in low or no visible light conditions); and a light for visible illumination of the emergency event site and areas proximate to the emergency event site.

In one preferred and non-limiting embodiment or example, the means for detecting or scanning the temperature can include a bimetallic temperature sensor, a Resistance Temperature Detector (RTD), a non-contact temperature sensor, e.g., an infrared sensor, or a combination thereof.

In one preferred and non-limiting embodiment or example, the means for detecting unsafe levels of smoke, flammable gas, and/or CO can include a conventional smoke and/or CO detector(s).

In one preferred and non-limiting embodiment or example, the means for calling emergency personnel can include a transmitter or transceiver configured to wirelessly communicate with the emergency personnel via a wireless system. In an example, the transmitter or transceiver can be a radio or optical transmitter or transceiver that communicates using radio waves or visible or invisible light. In an example, the wireless system can be local area network (LAN), a wide area network (WAN), a cellular network, or a combination thereof.

In one preferred and non-limiting embodiment or example, the means for providing emergency personnel and passengers with safety instructions can include a speaker for outputting voice instructions and/or a light.

In one preferred and non-limiting embodiment or example, each UAV can be stored in an enclosure on a car of the MTV. In an example, each UAV can be charged via solar cells carried by the MTV when possible.

In one preferred and non-limiting embodiment or example, each UAV can be configured and/or controlled to perform operations other than support during an emergency event. For example, a UAV can be used for inspection and collection of data regarding the MTV, the track or pathway of the MTV, and/or terrain related to the operation of the MTV.

In one preferred and non-limiting embodiment or example, the tunnel can include a wireless system that can be used for communication between the OCC and each UAV.

In one preferred and non-limiting embodiment or example, the wireless system can include radio, infrared and/or ultrasound transmitters that can transmit wireless radio signals, wireless infrared signals, and/or wireless ultrasound signals that can be received by one or more suitable sensors of the UAV. In an example, the sensor for receiving radio signals can include an antenna coupled to a radio receiver or transceiver of the UAV. The sensor for receiving infrared signals can include an infrared optical detector. The sensor for receiving ultrasound signals can include a piezoelectric or capacitance based detector.

In an example, the wireless signal(s) can include position data that the UAV can use for determining its location or position (e.g., in a tunnel) when satellite GPS signals are unavailable or cannot be used by the UAV for this purpose, e.g., when no or insufficient satellite GPS signals can reach the UAV in the tunnel. This position data can then be used for controlling flight movement of the UAV, e.g., in the tunnel.

In an example, the one or more suitable sensors of the UAV can include, coupled to the controller of the UAV, a GPS receiver 66 (FIG. 2) for receiving satellite GPS signals when available. Based on the received satellite GPS signals and map data regarding the tunnel available to the UAV, the controller of the UAV can control the flight of the UAV within the tunnel in a manner to avoid the UAV from moving into contact with a wall of the tunnel.

In one preferred and non-limiting embodiment or example, the wireless system can broadcast local positioning signals, versus GPS signals that originate at satellites. The antenna and radio receiver of the UAV can receive the local positioning signals broadcast via the wireless system. A controller of the UAV can use local position data embedded in the local positioning signals, along with map data of the tunnel available to the controller, to control the flight of the UAV within the tunnel in a manner to avoid the UAV from moving into contact with a wall of the tunnel.

In one preferred and non-limiting embodiment or example, radio signals, infrared signals, and/or ultrasound signals can also or alternatively be used for communication between the UAV and the OCC via the wireless system. To this end, each UAV can include an antenna and a radio transceiver for radio communication between the UAV and the OCC via the wireless system when used as a radio antenna. Also or alternatively, each UAV can include one or more infrared and/or ultrasound transmitters in addition to one or more receiving sensors in the nature of infrared and/or ultrasound detectors for infrared and/or ultrasound communication. In this case, the wireless system can include infrared and/or ultrasound receivers in addition to infrared and/or ultrasound transmitters.

In one preferred and non-limiting embodiment or example, each UAV can be configured to analyse air quality (or chemical/fumes/particles) with an onboard air/smoke sensor. In an example, the UAV can locally analyse air quality and a decision can be made, either by the controller of the UAV or an operator of the UAV, on an action to take (evacuate in an alternate direction, etc.).

In one preferred and non-limiting embodiment or example, each UAV can be configured to autonomously (i.e., without receiving a command from the OCC) open or release doors, emergency escapes (windows, detrainment doors), etc. of a car of the MTV.

In one preferred and non-limiting embodiment or example, the MTV can include two or more UAVs, e.g., for redundancy or for use in coordination with each other.

In one preferred and non-limiting embodiment or example, each UAV can be in a car other than an end car, e.g., each UAV can be located on the third car (vehicle) from either end of the MTV, to reduce or avoid the UAV from being affected by an emergency event and/or to allow sufficient time for the UAV to detect an impact (or acceleration representative of an accident), either by sensors located on the UAV itself or one of the cars (usually on the front car) and to become airborne in order not to be affected by the emergency event, e.g., an accident/crash.

In one preferred and non-limiting embodiment or example, the UAV can document the emergency event by taking a video recording of the emergency event. The sensor on the UAV can detect accelerations to which the UAV is subjected and take off from the car when a predetermined acceleration (either positive or negative) threshold is reached. This threshold can be less than a maximum acceleration level (either positive or negative, i.e., either acceleration or deceleration), which represents a maximum acceleration level that the UAV may sustain without suffering damage. Once this threshold is reached, the UAV can take flight, for example, autonomously, to avoid damage or being involved in an emergency event, e.g., a crash of the MTV. The acceleration level may be measured over a certain time to determine jerk, or the severity of an impact.

In one preferred and non-limiting embodiment or example, the UAV may communicate directly with passengers on-board the MTV (either visually, with a light, e.g., a laser, or audibly with audio instructions via a speaker, or by sending signals directly to passengers' cellular phones via a radio transmitter or transceiver of the UAV. In an example, passengers may be asked to turn on their cellular phone lights to produce safety lighting, or passengers could receive instructions on their phone (i.e., written/text instructions or graphical instructions).

In one preferred and non-limiting embodiment or example, the UAV can carry safety equipment to passengers and crew.

In one preferred and non-limiting embodiment or example, the UAV can be configured to recognize passengers with a handicap and provide special assistance to them, or ask, via a speaker of the UAV, a fellow passenger to provide assistance to the handicapped passenger.

In one preferred and non-limiting embodiment or example, the UAV can be configured with a recognition algorithm that enables the UAV to recognize a suspicious package, lift it, and bring it out of the way of harm to passengers, i.e., the UAV could pick up the suspicious package inside the vehicle, leave the vehicle through a door or window or other opening, and dispose of the package in a safe area.

In one preferred and non-limiting embodiment or example, the UAV can be equipped with one or more lasers to trace a path/corridor for the passengers to follow. In an example, the UAV can be equipped with different sensors to evaluate the emergency situation. For example, the UAV can be equipped with sensors that enable counting of passengers, guiding passengers, and/or interacting with the MTV, or the tunnel, or the track, or an MTV pathway to evacuate passengers to safety.

In one preferred and non-limiting embodiment or example, while two or more UAVs may act independently or redundantly, they may also act in symbiosis/combination to split tasks to be done, to be physically located in different locations, and/or to interact together to complete the same task that would require or benefit from the use of two or more UAVs.

In one preferred and non-limiting embodiment or example, there can be interaction either between two UAVs, or between a UAV and a car of the MTV, between a UAV and the track, or between a UAV and passengers and/or crew of the MTV. In an example, the UAV may operate in a tunnel or not. In an example, the UAV can sacrifice itself by, for example, flying into a fire in order to detect important parameter (such as type of fire, combustion products, etc.).

In one preferred and non-limiting embodiment or example, disclosed herein is a method of operating one or more UAVs in a proximity of a MTV comprising: providing a UAV aboard said MTV; then detecting an event involving said MTV; then instructing the UAV to separate from said MTV based on said event.

The method can further include detecting the event using a sensor aboard the UAV.

The method can further include detecting the event while the UAV is connected to the MTV, said sensor being operative to detect at least one of an acceleration, temperature and smoke.

The method can further include determining which one of at least two UAVs is located closer to a location where the event takes place.

The method can further include at least one of said at least two UAVs taking off from the MTV upon detecting that the event may be detrimental to the integrity of said UAV.

The method can further include at least one of said at least two UAVs positioning itself proximate a door to orient passengers towards a safe area away from said MTV.

In the method, detecting the event can include receiving a signal initiated by a passenger or crew of the MTV.

In one preferred and non-limiting embodiment or example, also disclosed herein is an on-site observation system for a MTV comprising: a car body resting on wheels, the car body having a roof and side doors; and a UAV located on said roof, said UAV being longitudinally located in a middle portion of said car body.

The UAV can be equipped with a controller and one or more sensor(s) for detecting at least one of smoke, acceleration and temperature, said controller being operative to launch said UAV from said roof upon detecting with said one or more sensor(s) a level of at least one of smoke, acceleration and temperature exceeding a predetermined threshold.

In one preferred and non-limiting embodiment or example, also disclosed herein is a train comprising at least a first, a median, and a last car sequentially connected to one another, wherein the median car is equipped with a UAV docking station on its roof and a UAV adapted to dock into said docking station, said UAV being equipped with a sensor and a controller, said controller being operative to launch said UAV upon receiving a signal from said sensor indicative of a sensed value exceeding a predetermined threshold, the sensor being operative to detect one of an acceleration, an angle, a temperature and light.

In one preferred and non-limiting embodiment or example, also disclosed herein is a method of operating a UAV proximate a rail vehicle located in an at least partially enclosed environment comprising: providing a docking station for said UAV inside said at least partially enclosed environment; providing said UAV attached to said docking station; providing a local positioning system allowing said UAV to physically position itself within the at least partially enclosed environment; then detecting an event involving said MTV when said MTV is within said at least partially enclosed environment; then instructing said UAV to take off from said docking station based on said event; and then navigating said UAV proximate a door of said rail vehicle.

The method can further include causing the UAV to project light downwardly towards a ground so as to light the ground ahead of passengers or crew of the rail vehicle.

The method can further include the UAV leading passengers and/or crew towards an exit of the at least partially enclosed environment.

In one preferred and non-limiting embodiment or example, also disclosed herein is a method of operating a UAV proximate a rail vehicle located in a tunnel, the method comprising: providing a rail vehicle; providing a UAV; providing a UAV docking station proximate a roof of said rail vehicle; providing a local positioning system allowing said UAV to physically position itself within the at least partially enclosed environment; then using said UAV, detecting an event within said tunnel involving said rail vehicle; then instructing said UAV to take off from said docking station based on said event; and then navigating said UAV in an empty space defined between the tunnel and said rail vehicle at least partially based on said local positioning system.

The method can further include said local positioning system using beacons mounted to the tunnel.

The method can further include said beacons emitting one of radio, infrared or ultrasound waves.

The method can further include encoding said waves so that a controller of the UAV may calculate a spatial position of the UAV.

The method can further include providing two UAVs.

Further preferred and non-limiting embodiments or aspects are set forth in the following numbered clauses.

Clause 1: A method comprising: (a) providing, on-board a mass transit vehicle (MTV), at least one unmanned aerial vehicle (UAV), each UAV including a controller comprising a processor and memory; (b) determining, by the controller of the UVA while on-board the MTV in a tunnel, at least one of the following: an acceleration, positive or negative, greater than a predetermined acceleration, an angle greater than a predetermined angle, a temperature greater than a predetermined temperature, and the presence of particles, gas or both greater than a predetermined concentration; (c) in response to the determining in step (b), the UAV separating from the MTV and becoming airborne within the tunnel; and (d) following step (c), executing, by the UAV, flight movement of the UAV within the tunnel.

Clause 2: The method of clause 1, wherein step (d) can include the UAV executing the flight movement autonomously, under a control of an operator positioned outside the tunnel, or partially autonomously and partially under the control of the operator positioned outside the tunnel.

Clause 3: The method of clause 1 or 2, wherein step (c) can include the UAV becoming airborne autonomously or in response to a remotely initiated command.

Clause 4: The method of any one of clauses 1-3, wherein: the tunnel can include a local wireless system configured to output wireless signals; and the UAV can include a sensor for receiving the wireless signals output by the local wireless system and the controller can be configured to process the received wireless signals to: determine a spatial position of the UAV in the tunnel, to control the flight movement of the UAV in the tunnel, or both.

Clause 5: The method of any one of clauses 1-4, wherein: the wireless signals can comprise one of the following: radio signals, infrared signals, or ultrasound signals; and the sensor can include an antenna, an infrared detector, or an ultrasound detector for receiving the respective radio signals, infrared signals, or ultrasound signals.

Clause 6: The method of any one of clauses 1-5, wherein controlling the flight movement of the UAV in the tunnel can include positioning the UAV proximate an entrance or exit of the tunnel.

Clause 7: The method of any one of clauses 1-6, wherein: the UVA can include, coupled to the controller, one or more accelerometers, each accelerometer configured to output a signal corresponding to the change in the acceleration, the angle, or both; and the controller can be configured to determine, based on the signal output by each accelerometer and one or more values stored in the memory corresponding to the predetermined acceleration, the predetermined angle, or both, the presence of the acceleration greater than the predetermined acceleration, the presence of the angle greater than the predetermined angle, or both.

Clause 8: The method of any one of clauses 1-7, wherein step (d) can include the UAV executing the flight movement in response to commands for flight movement received by the UAV from one or more antennas positioned in the tunnel.

Clause 9: The method of any one of clauses 1-8, wherein the UAV can include at least one of the following: (i) one or more cameras, wherein for each camera of the UAV, the controller can be configured to output via an antenna of the UAV to the one or more antennas positioned in the tunnel, a stream of video images acquired by the camera; (ii) a radar system configured to output to the controller an indication of a presence of an object; (iii) an audio speaker coupled to the controller, the controller configured to cause the audio speaker to output an audio signal in response to receiving audio data from the one or more antennas positioned in the tunnel via the antenna of the UAV; and (iv) a light, wherein the controller can be configured to control the on-off state of the light.

Clause 10: The method of any one of clauses 1-9, wherein the audio signal can include an audio sound (e.g., a beep) or message (e.g., "exit and move to the right").

Clause 11: The method of any one of clauses 1-10, wherein the light can be an LED.

Clause 12: The method of any one of clauses 1-11, wherein the controller can be configured to output via the antenna of the UAV to the one or more antennas positioned in the tunnel the indication of the presence of the object.

Clause 13: The method of any one of clauses 1-12, wherein the indication of the presence of the object can be output in real-time.

Clause 14: The method of any one of clauses 1-13, wherein the one or more cameras can include at least one of the following: an optical video camera configured to output the stream of video images in a human visual spectrum; and a thermal video camera configured to output the stream of video images in an infrared spectrum.

Clause 15: The method of any one of clauses 1-14, wherein each stream of video images can be output in real-time.

Clause 16: The method of any one of clauses 1-15, wherein the UAV can include at least one of the following: one or more accelerometers configured to detect the acceleration, the angle, or both; a temperature sensor configured to detect temperature; and a smoke detector configured to detect the presence of particles, gas or both greater than the predetermined concentration.

Clause 17: The method of any one of clauses 1-16, wherein: the MTV can include a plurality of UAVs; and the plurality of UAVs can be configured to execute flight movements in coordination autonomously, or under control of an operator positioned outside the tunnel, or partially autonomously, or partially under the control of the operator positioned outside the tunnel.

Clause 18: The method of any one of clauses 1-17, can further include: (e) following step (d), positioning the at least one UAV proximate a door of the MTV; and (f) following step (e), and while the at least one UAV is positioned proximate the door of the MTV, outputting, by the UAV, at least one of the following: an audio signal, an audio message, and visible light.

Clause 19: The method of any one of clauses 1-18, can further include: (e) following step (d), positioning the at least one UAV proximate an entrance or exit of the tunnel; and (f) following step (e), and while the at least one UAV is positioned proximate the entrance or exit of the tunnel, outputting, by the UAV, at least one of the following: an audio signal, an audio message, and visible light.

Clause 20: The method of any one of clauses 1-19, wherein, in step (a), each UAV can be provided on a vehicle of the MTV between the first and last vehicle of the MTV.

Clause 21: The method of any one of clauses 1-20, wherein the UAV can be a copter UAV.

Clause 22: The method of any one of clauses 1-21, wherein step (b) can further include determining the presence of a signal initiated manually, e.g., by a passenger.

DESCRIPTION OF THE INVENTION

Figure 1:
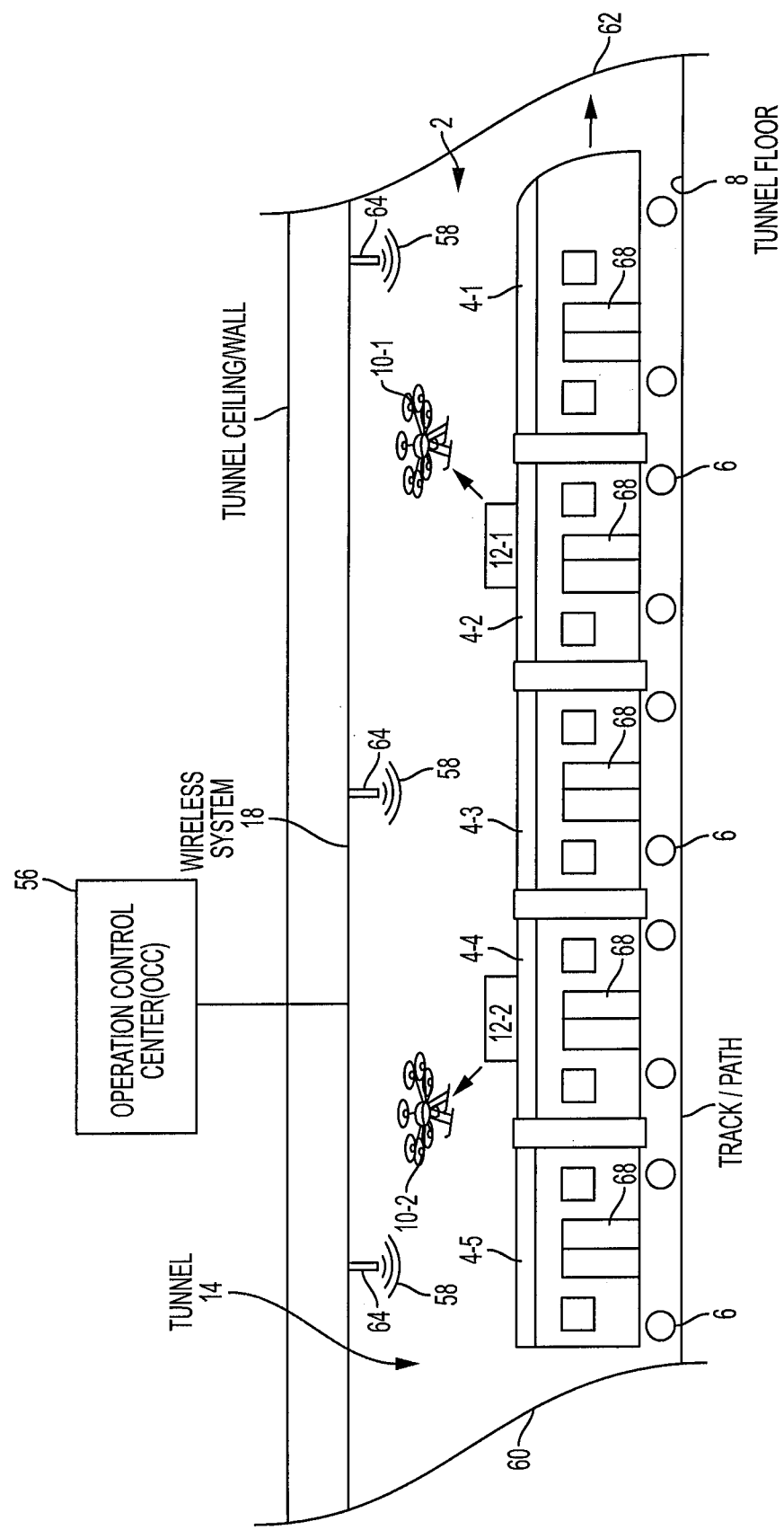
FIG. 1 is a schematic view of a train, such as a mass transit vehicle, in a tunnel that includes a wireless system coupled to an operations control center, showing deployment of a pair of unmanned aerial vehicles from enclosures or compartments on the MTV in accordance with the principles described herein.

For the purposes of the following detailed description, it is to be understood that the invention may assume various alternative variations and step sequences, except where expressly specified to the contrary. It is also to be understood that the specific devices and methods described in the following specification are simply exemplary embodiments, examples, or aspects of the invention. Moreover, other than in any operating examples, or where otherwise indicated, all numbers expressing, in preferred and non-limiting embodiments, examples, or aspects, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the Doctrine of Equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

It is also to be understood that the specific devices and processes illustrated in the attached drawings, and described in the following specification, are simply exemplary embodiments, examples, or aspects of the invention. Hence, specific dimensions and other physical characteristics related to the embodiments, examples, or aspects disclosed herein are not to be considered as limiting. Certain preferred and non-limiting embodiments, examples, or aspects of the present invention will be described with reference to the accompanying figures where like reference numbers correspond to like or functionally equivalent elements.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise.

The present disclosure is directed to the use of one or more unmanned aerial vehicle(s) (UAV) to provide assistance to passengers and crew of a train during an emergency event, such as a crash, derailment, or any other type of emergency event where the train is disabled, and, more particularly, to providing such assistance using an unmanned aerial vehicle (UAV) autonomously, semi-autonomously, or under the control of a UAV operation during an emergency event occurring in a tunnel.

With reference to FIG. 1, a MTV 2, such as a mass transit vehicle (MTV), includes a number of cars, for example, cars 4-1-4-5. The number of cars is not to be construed in a limiting sense.

In one preferred and non-limiting embodiment or example, MTV 2 can include wheels 6, such as, for example, tired wheels or steel rail wheels configured to roll along a pathway 8 in the nature of a roadway or steel rails in a manner known in the art. However, this is not to be construed in a limiting sense since it is also envisioned that wheels 6 can be configured to roll on a monorail or wheels 6 can be omitted completely where MTV 2 is configured to float above pathway 8 by magnetic levitation.

In one preferred and non-limiting embodiment or example, provided on board MTV 2 is at least one unmanned aerial vehicle (UAV) 10, also known as a drone. In an example, as shown in FIG. 1, MTV 2 can be provided with two or more drones 10-1, 10-2, etc. for use individually, for redundancy, or for use in combination or coordination with each other.

In one preferred and non-limiting embodiment or example, each UAV 10 can be housed in an enclosure 12 of a car 4 of MTV 2. For example, UAV 10-1 can be housed in enclosure 12-1 and/or UAV 10-2 can be housed in enclosure 12-2. In an example, each enclosure 12 can be located longitudinally at or near the middle of its respective car 4. In an example, each enclosure 12 can include a docking station to which its respective UAV 10 can be attached. In an example, each UAV 10 can be configured to leave its respective enclosure 12 and, if provided, docking station and separate from MTV 2 and become airborne upon determining the occurrence of one or more predetermined events, such as, one or more emergency events.

In one preferred and non-limiting embodiment or example, the use of UAVs 10 in connection with one or more emergency events finds particular application in connection with one or more emergency events involving MTV 2 traveling in a tunnel 14 where there is limited access to MTV 2 by emergency personnel in response to one or more emergency events. In an example, it is envisioned that one or more UAVs 10 can be used to provide autonomous or remote assistance to passengers and crew of MTV 2 in tunnel 14 during an emergency event involving MTV 2. While it is envisioned that UAVs 10 find particular application in connection with assisting passengers and crew of MTV 2 in tunnel 14, this is not to be construed in a limiting sense since it is envisioned that one or more UAVs 10 can also be used for assisting passengers and crew of MTV 2 outside of tunnel 14. For the purpose of description hereinafter, the use of one or more UAVs 10 in connection with an emergency event involving MTV 2 in a tunnel 14 will be described. However, this is not to be construed in a limiting sense.

Figure 2:
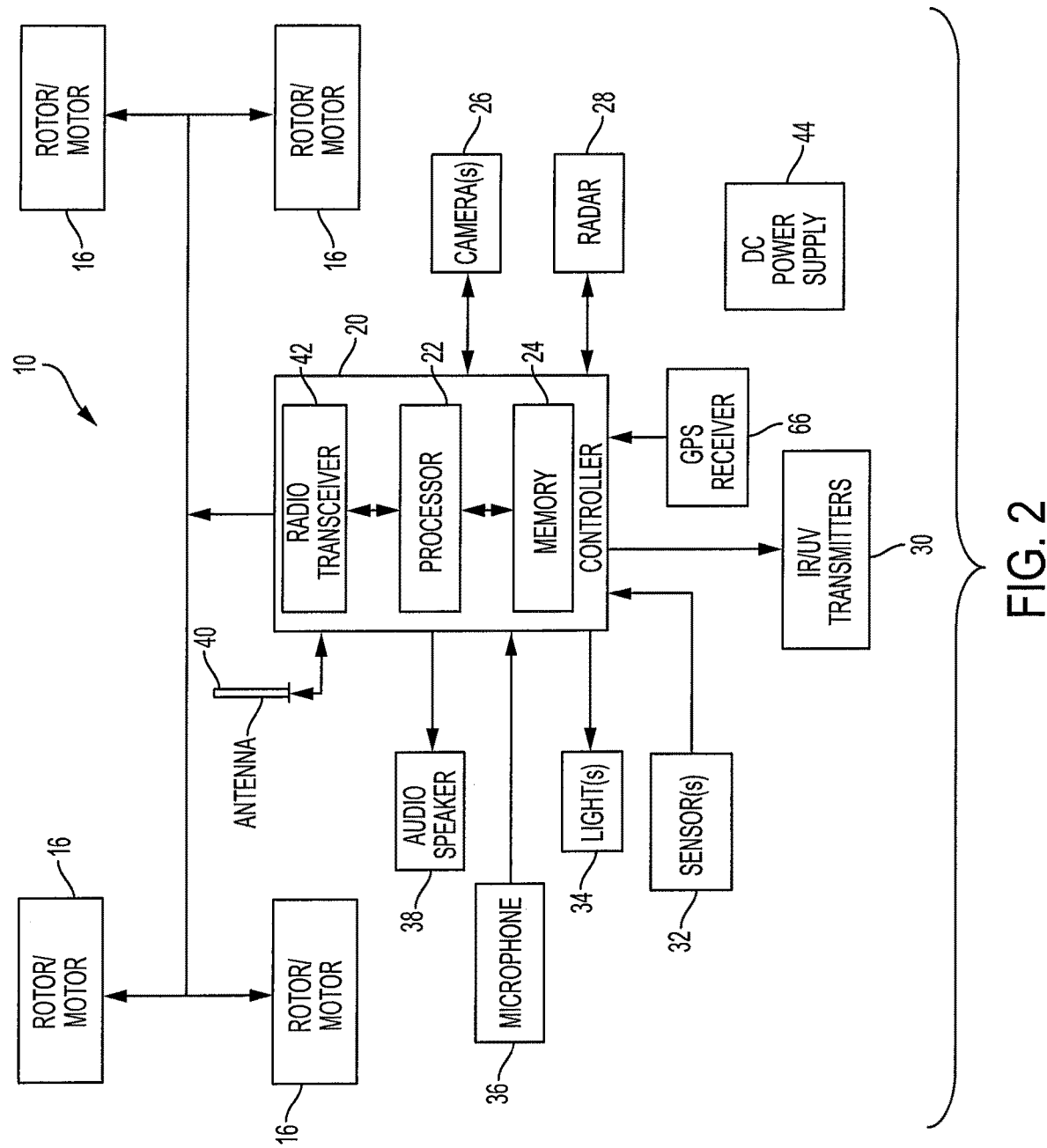
FIG. 2 is a block diagram of exemplary elements comprising each unmanned aerial vehicle shown in FIG. 1 in accordance with the principles described herein.

With reference to FIG. 2 and with continuing reference to FIG. 1, in one preferred and non-limiting embodiment or example, each UAV 10 can include a controller 20 comprising a processor 22 and a memory 24. In an example, UAV 10 can be a copter-type UAV including a number of combination rotors/motors 16 which operate under the control of controller 20 in a manner known in the art to enable UAV 10 to fly and execute flight movements, also in a manner known in the art. The description of each UAV 10 being a copter-type UAV, however, is not to be construed in a limiting sense since it is envisioned that the one or more UAVs 10 can be fixed wing-type UAVs. For the purpose of description herein, it will be assumed that each UAV 10 is a copter-type UAV.

In one preferred and non-limiting embodiment or example, UAV 10 can include one or more of the following elements operatively coupled to controller 20: one or more cameras 26; a radar system 28; one or more cameras infrared/ultraviolet transmitters 30; one or more sensors 32; one or more lights 34; a microphone 36; an audio speaker 38; and an antenna 40 coupled to a radio transceiver 42. Each UAV 10 can also include a DC power supply 44 configured to supply electrical power from the operation of the various elements 20-42 of UAV 10 that require DC electrical power for their operation. DC power supply 44 can be charged with electrical power from MTV 2 and/or from one or more solar panels positioned atop one or more cars 4 of MTV 2.

Figure 3:
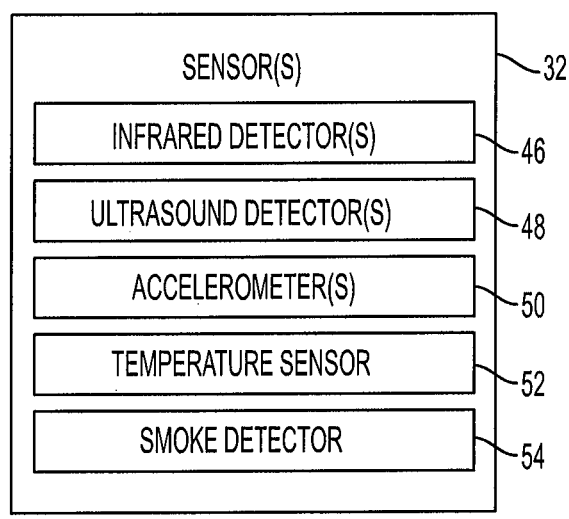
FIG. 3 is a block diagram showing various elements that can comprise the sensor(s) shown in FIG. 2 in accordance with the principles described herein.

With reference to FIG. 3 and with continuing reference to FIGS. 1 and 2, in one preferred and non-limiting embodiment or example, the one or more sensors 32 can include one or more of the following: one or more infrared detectors 46; one or more ultrasound detectors 48; one or more accelerometers 50; one or more temperature detectors 52; and one or more smoke detectors 54. However, this is not to be construed in a limiting sense since the use of other sensors is also envisioned. Moreover, it is to be appreciated that, when used to receive radio signals, antenna 40 can also be considered a sensor, but is shown separately.

Having thus described MTV 2 in tunnel 14, one preferred and non-limiting embodiment or example, example UAV 10 including example elements operatively coupled to controller 20 and a method of using one or more example UAVs 10 will now be described.

In one preferred and non-limiting embodiment or example, at least one UAV 10 is provided onboard MTV 2. While onboard MTV 2 in tunnel 14, controller 20 of UAV 10 can, with reference to the output of one or more suitable sensors 32, be operative for determining at least one of the following events: an acceleration (accelerometer(s) 50), positive or negative, greater than a predetermined acceleration stored in memory 24; an angle (accelerometer(s) 50) greater than a predetermined angle stored in memory 24; a temperature (temperature sensor 52) greater than a predetermined temperature stored in memory 24; and the presence of smoke (smoke detector 54), including particles, gas, or both greater than one or more predetermined concentrations stored in memory 24.

In one preferred and non-limiting embodiment or example, as used herein, when the output of a device, e.g., the accelerometer, is described as having a value greater than a predetermined value, it is to be understood that said "greater" value can be any one or more of a value greater than a predetermined positive value stored in memory 24, a value less than a predetermined negative value stored in memory 24, or value greater than or less than a predetermined absolute value stored in memory 24.

In one preferred and non-limiting embodiment or example, in response to controller 20 of UAV 10 determining at least one of the foregoing events, UAV 10 can separate, in an example, separate autonomously, from MTV 2 and become airborne within tunnel 14. Thereafter, controller 20 can cause UAV 10 to execute flight movement within tunnel 14.

In one preferred and non-limiting embodiment or example, UAV 10 can execute flight movement autonomously under the control of controller 20 alone, under the control of an operator positioned outside tunnel 14 via commands modulated on one or more signals received by one or more sensors 46, 48 and/or by antenna 40 via a wireless system 18 of tunnel 14, or partially autonomously and partially under the control of an operator positioned outside tunnel 14, i.e., semi-autonomously. In an example, controlling the flight movement of UAV 10 in tunnel 14 can include positioning UAV 10 proximate an entrance 60 or exit 62 of tunnel 14.

In one preferred and non-limiting embodiment or example, UAV 10 can become airborne autonomously or in response to a remotely initiated command. In an example of UAV becoming airborne autonomously, controller 20 can be configured to detect one or more of the foregoing events (namely, acceleration greater than a predetermined acceleration, an angle greater than a predetermined angle, a temperature greater than a predetermined temperature, and/or the presence of particles, gas, or both greater than one or more predetermined concentrations) and, in response, can cause UAV 10 to separate from MTV 2 and become airborne without any human intervention. In this manner, in response to detecting an emergency event, UAV 10 can separate from MTV 2 quickly thereby avoiding damage to UAV 10 caused by the emergency event.

In one preferred and non-limiting embodiment or example of UAV becoming airborne in response to a remotely initiated command, the remotely initiated command can be a local command, e.g., the press of a button, issued by a passenger or crew member of MTV 2 to UAV 10, or may be communicated to UAV 10 via the wireless system 18 installed in tunnel 14 and coupled to an operation control center (OCC) 56. In an example, an operator at OCC can cause wireless system 18 to output a remotely initiated command which can be received by controller 20 of UAV 10 via one or more sensors 32 and/or antenna 40. In response to receiving this command, UAV 10 can separate from MTV 2 and become airborne within tunnel 14.

In one preferred and non-limiting embodiment or example, it is envisioned that at least controller 20 and one or more sensors 32 of UAV 10 can be in an active, powered-up and operational state at least at times when MTV 2 is in operation. In this manner, UAV 10 is capable of responding quickly to an emergency event without having to first boot or initialize to its operational state.

In one preferred and non-limiting embodiment or example, wireless system 18 can also or alternatively output wireless signals, in the nature of local positioning signals that can include embedded therein local data for processing by controller 20 to determine a spatial position of UAV 10 in tunnel 14; to control the flight movement of UAV 10 in tunnel 14; or both. These wireless signals, in the nature of local positioning signals, can comprise at least one of the following: radio signals, infrared signals, or ultrasound signals. The sensor used by UAV to receive these wireless signals can include antenna 40, infrared detector 46, or ultrasound detector 48 for receiving the respective radio signals, infrared signals, or ultrasound signals. These wireless signals are individually and collectively denoted by reference number 58 in FIG. 1.

In one preferred and non-limiting embodiment or example, UAV 10 can include one or more accelerometers 50 coupled to controller 20. Each accelerometer 50 is configured to output a signal corresponding to acceleration. Controller 20 can be configured to determine, based on the signal output by each accelerometer 50 and one or more values stored in memory 24 corresponding to the predetermined acceleration, the predetermined angle, or both, the presence of acceleration greater than the predetermined acceleration, the presence of an angle greater than the predetermined angle, or both. In an example, acceleration, positive or negative, greater than a predetermined, positive or negative, acceleration can be indicative of an impending crash of MTV 2, e.g., the application of full braking, or the existence of a crash of MTV 2 in process. The presence of an angle greater than the predetermined angle can be indicative of one or more cars 4 of MTV 2 tipping forward, backward, or sideways in response to a crash or derailment event.

In one preferred and non-limiting embodiment or example, wireless system 18 can include one or more antennas or beacons 64. In an example, wireless system 18 can include a number of antennas or beacons 64 positioned strategically within tunnel 14 for the purpose of facilitating communication between OCC 56 and each UAV 10 and to, optionally, provide local positioning signals to each UAV that enables controller 20 of said UAV 10 to determine the position of UAV 10 within tunnel 14. Using local position data embedded in the local positioning signals along with map data of tunnel 14 included in memory 24 of controller 20 or downloaded to controller 20 via wireless system 18, controller 20 of each UAV 10 can, in an emergency event, navigate (fly) within tunnel 14 in a manner to avoid flying into obstacles, determine a closest opening for evacuation of passengers and crew of MTV 2, etc. Such opening can include entrance 60 of tunnel 14, exit 62 of tunnel 14, and/or one or more passages formed in a wall of tunnel 14 to provide a pathway for ingress to and egress from tunnel 14.

In one preferred and non-limiting embodiment or example, flight movement of UAV 10 within tunnel 14 can be executed autonomously, semi-autonomously, or fully under the control of an operator at OCC 56. In an example, UAV 10 executes flight movement in response to commands for flight movement received by antenna 40, infrared detector(s) 46, and/or ultrasound detector(s) 48 of UAV 10 from OCC 56 via wireless system 18 positioned in tunnel 14.

In one preferred and non-limiting embodiment or example, to enable control of UAV 10 by an operator at OCC 56 during flight of UAV 10 in tunnel 14, UAV 10 can include one or more of the following: one or more cameras 26, each of which can provide to controller 20 of UAV 10 a stream of video images acquired by said camera. Controller 20 can, in turn, output to OCC 56 via antenna 40 and wireless system 18 the stream of video images acquired by said camera(s) 26. The one or more cameras 26 can include at least one of the following: an optical video camera configured to output the stream of video images in a human visual spectrum; and a thermal video camera configured to output the stream of video images in an infrared spectrum. In an example, each stream of video images can be output in real-time or substantially real-time. An operator at OCC 56 can view the stream of video images on a monitor and can control the flight of UAV 10 in tunnel 14 based on the stream of video images displayed on the monitor.

In one preferred and non-limiting embodiment or example, radar system 28 can, in a manner known in the art, be configured to output to controller 20 an indication of a presence of an object within tunnel 14. This indication can be used by controller 20 locally for autonomous collision avoidance and/or can be forwarded to OCC 56 via wireless system 18 for use by an operator at OCC 56 controlling the flight movement of UAV 10 within tunnel 14 for collision avoidance. For example, controller 20 can be configured to output via antenna 40 of UAV 10 to OCC 56 via wireless system 18, an indication of the presence of the object detected by radar system 28 of UAV 10. An operator at OCC 56 can then utilize this indication to control flight movement of UAV 10 within tunnel 14. In an example, the indication of the presence of the object can be output in real-time or substantially real-time, thereby enabling real-time or substantially real-time control of UAV 10 in tunnel 14 by an operator at OCC 56.

In one preferred and non-limiting embodiment or example, controller 20 can be configured to cause audio speaker 38 to output an audio signal, such as voice commands, programmed into controller 20 and/or received by controller 20 from OCC 56 via wireless system 18 and antenna 40 of UAV 10.

In one preferred and non-limiting embodiment or example, controller 20 can be configured to control the on-off state of one or more lights 34 either autonomously, semi-autonomously, or in response to one or more light control commands received from OCC 56 via wireless system 18 and antenna 40. In an example, each light can be an LED or a laser diode. However, this is not to be construed in a limiting sense.

In one preferred and non-limiting embodiment or example, UAV 10 can include one or more of the following sensors: the one or more accelerometers 50 (discussed above) configured to detect the acceleration, the angle, or both (which can be indicative of an impending crash or a crash in process); and a temperature detector or sensor 52 configured to detect a temperature proximate UAV 10 that controller 20 can compare to a predetermined temperature stored in memory 24 to determine if the sensed temperature is greater than the predetermined temperature. In an example, the predetermined temperature can be indicative of the presence of a fire proximate to UAV 10. In an example, UAV 10 can also include a smoke detector sensor configured to detect the presence of particles, gas, or both greater than one or more predetermined concentrations, which can be indicative of the presence of fire or smoke proximate to UAV 10.

In one preferred and non-limiting embodiment or example, the one or more of the sensors can be provided on one or more cars 4 of the MTV 2 (in addition to or alternatively to one or more UAVs 10) and the output of each said sensor can be provided directly to one or more UAVs 10 via a wired and/or wireless communication link for processing in the manner described above. In another preferred and non-limiting embodiment or example, the output of each said sensor provided on one or more cars 4 of the MTV 2 can be provided to an on-board controller of the MTV 2, e.g., the controller of a Train Control and Management System (TCMS), which can process the output of said sensor to determine if said output has a value greater than a predetermined value stored in a memory of the TCMS, for example. Upon the TCMS controller determining that the value output by said sensor is greater than the predetermined value, the TCMS determining can, via a wired and/or wireless communication link, cause one or more UAVs 4 to take flight.

In one preferred and non-limiting embodiment or example, the one or more sensors can be provided on any one combination of UAVs 10 and cars 4, and the output of each said sensor can be processed by a controller 20 of one or more UAVs 10, a controller of the MTV 2, or some combination thereof whereupon one or more of the UAVs 10 can be caused to take flight in response to a suitable command issued by the controller 20 of the one or more UAVs 10, a controller of the MTV 2, or some combination thereof.

In one preferred and non-limiting embodiment or example, MTV 2 can include a plurality of UAVs 10. Each of the plurality of UAVs 10 can be configured to execute flight movements without reference to the flight movement of another UAV 10, or can be configured to execute flight movement in coordination with another UAV 10 autonomously, or under the control of an operator positioned outside tunnel 14, e.g., at OCC 56, or partially autonomously and partially under the control of the operator positioned outside of tunnel 14, i.e., semi-autonomously.

In one preferred and non-limiting embodiment or example, once a UAV 10 is in flight, the UAV 10 can be positioned proximate a door 68 of MTV 2. Door 68 can be a conventional passenger door or an emergency escape door. In an example, once UAV 2 is positioned proximate door 68, UAV can output an audio signal or audio message via audio speaker 38 and/or visible light via one or more lights 34, either autonomously, under the control of an operator at OCC 56 via wireless system 18 and antenna 40 of UAV 10, or semi-autonomously.

In one preferred and non-limiting embodiment or example, once UAV 10 is in flight, UAV 10 can be positioned proximate an opening of tunnel 14, such as entrance 60 or exit 62 of tunnel 14. While UAV 10 is positioned proximate the opening of tunnel 14 the UAV can output an audio message or signal via audio speaker 38 and/or visible light via one or more lights 34, either autonomously, under the control of an operator at OCC 56 via wireless system 18 and antenna 40, or semi-autonomously.

In one preferred and non-limiting embodiment or example, while it is envisioned that most communications between OCC 56 and UAV 10 can be radio communication via antenna 40 and radio transceiver 42 of UAV 10, it is also or alternatively envisioned that wireless system 18 and one or more sensors 32 can be utilized for communication using infrared signals and/or ultrasound signals. For example, sensors 32 can include infrared detectors 46 for receiving infrared signals from wireless system 18 and one or more of lights 34 can be infrared lights that can be used to output infrared signals to wireless system 18. In another example, sensors 32 of UAV 10 can include ultrasound detectors 48 for receiving infrared signals from wireless system 18 and audio speaker 38 can be configured to output ultrasound signals to wireless system 18. In an example, wireless system 18 can include beacons 64 configured with one or more suitable transmitter(s) and/or receiver(s) to output and receive infrared light and/or ultrasound. In this manner, communication between wireless system 18 and each UAV 10 is not necessarily limited to just radio signals.

In one preferred and non-limiting embodiment or example, each UAV 10 can be provided on a vehicle or car of MTV 2 between the first and last vehicle or car of MTV 2. Positioning each UAV 10 on a car 4 of MTV 2 other than the first or last car 4 of MTV 2 is believed to help avoid or reduce possible damage to the UAV 10 in the event of a crash of MTV 2, which crash can involve the first and/or last cars of MTV 2.

In one preferred and non-limiting embodiment or example, each UAV 10 can be a copter-type UAV. However, this is not to be construed in a limiting sense since the use of any type or style of UAV 10 including, without limitation, a fixed wing UAV, is envisioned.

Finally, in one preferred and non-limiting embodiment or example, also or alternatively to determining the occurrence of an emergency event (discussed above), UAV 10 can separate from MTV 2 and execute flight movement in response to detecting the presence of a signal initiated manually. This signal can be initiated by an operator on board MTV 2 or an operator stationed at OCC 56.

Figure 4A:
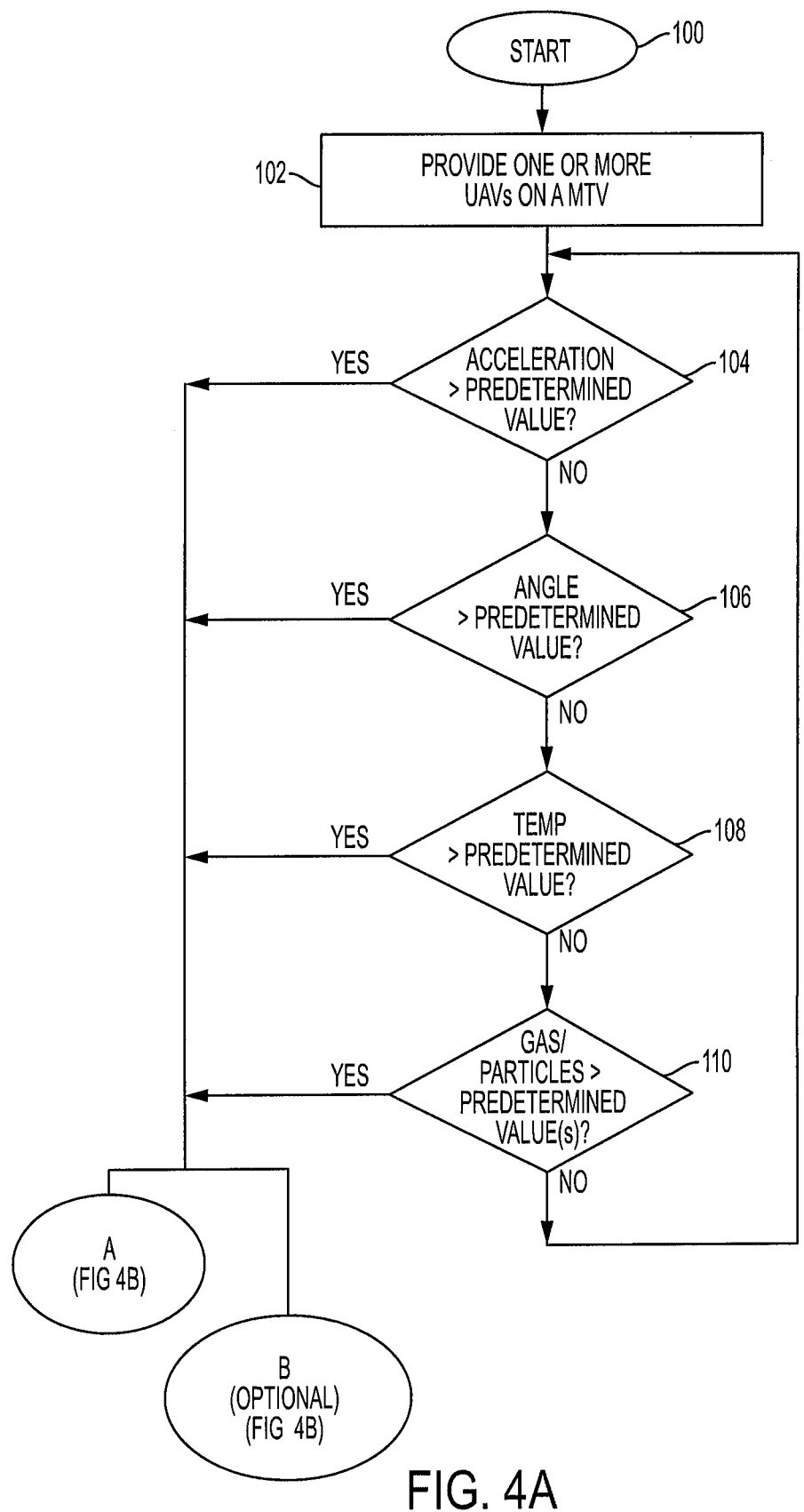
FIG. 4A and FIG. 4B is an example flow diagram in accordance with the principles described herein.
Figure 4B:
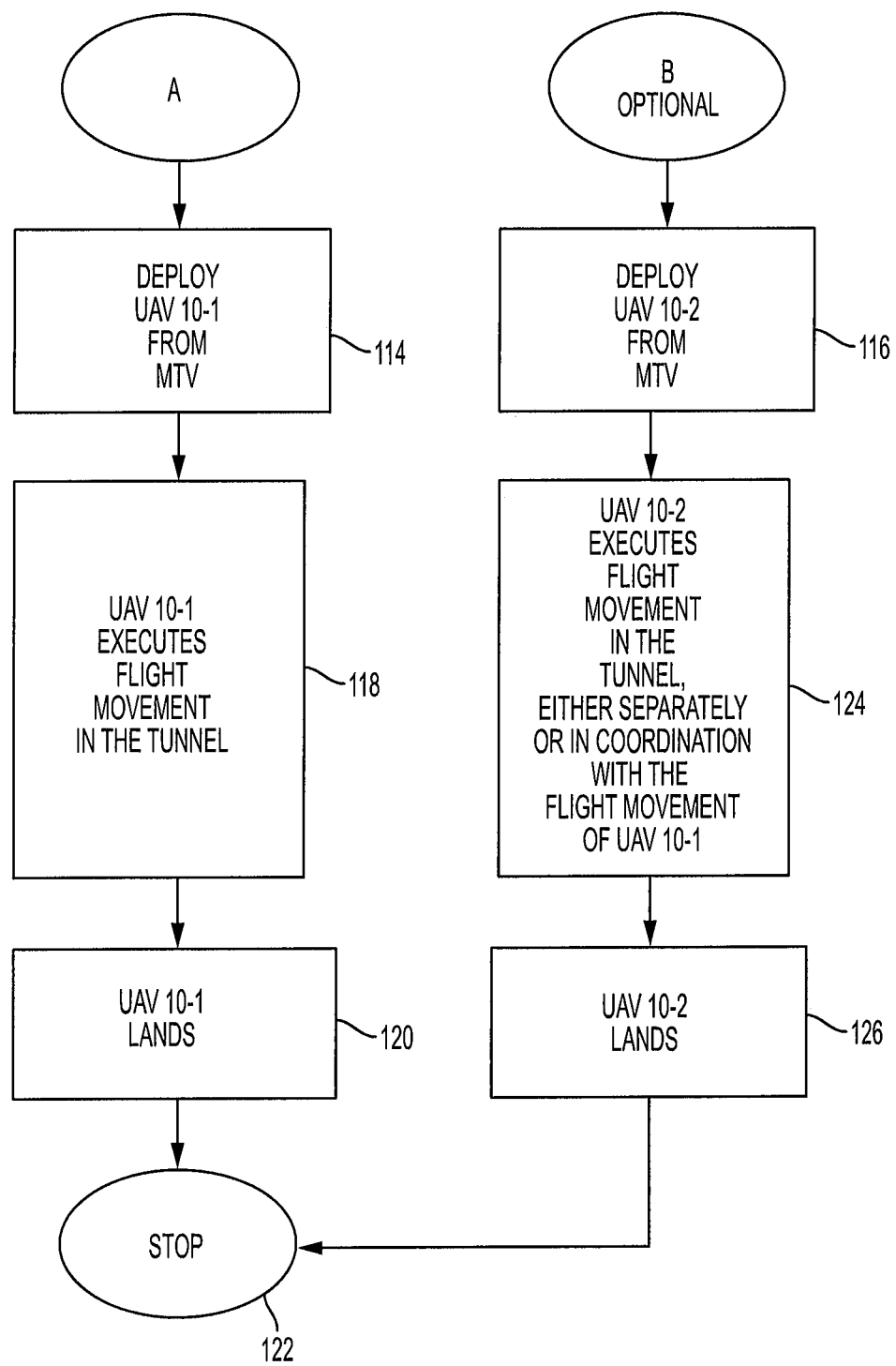

Referring now to FIGS. 4A and 4B and with continuing reference to all previous figures, in one preferred and non-limiting embodiment or example, a method in accordance with the principles described herein includes advancing from a start step 100 to a step 102 wherein one or more UAVs 10 are provided on an MTV 2. The method can then advance to steps 104, 106, 108, and 110. In step 104, a determination is made if acceleration is greater than a predetermined value. In step 106, a determination is made if an angle is greater than a predetermined value. In step 108, a determination is made if a temperature is greater than a predetermined value. Finally, in step 110, a determination is made if one or both of gas and/or particles are present in greater than one or more predetermined values or concentrations. In an example, the determinations made in steps 104-110 can be made by controller 20 of each UAV 10 with reference to one or more outputs of accelerometer(s) 50 (steps 104 and 106); temperature sensor 52 (step 108); and smoke detector 54 (step 110). However, this is not to be construed in a limiting sense since it is envisioned that one or more of these determinations can be made by suitable sensor(s) of MTV 2, which determination(s) can then be communicated in any suitable and/or desirable manner to controller(s) 20 of the one or more UAVs 10.

In one preferred and non-limiting embodiment or example, if the determination in each of steps 104-110 is negative (No), the method can repeat steps 104-110. However, if the determination in an instance of any one of steps 104-110 is affirmative (Yes), the method advances to step 114 and, optionally, step 116 via connector A and (optionally) connector B.

In step 114, a UAV 10 is deployed from MTV 2. In an example, this deployment can include UAV 10-1 separating from MTV 2 and becoming airborne within tunnel 14. From step 114, the method can then advance to step 118 where UAV 10-1 executes flight movement in the tunnel 14. This flight movement can be autonomous, semi-autonomous, or fully manual, e.g., under the control of an operator that can be stationed at OCC 56. Thereafter, once UAV 10-1 is deemed to have completed executing its mission, the method can advance to step 120 UAV 10-1 lands. Finally, the method can advance to stop step 122.

In one preferred and non-limiting embodiment or example, assuming optional step 116 is also executed (in addition to step 114), UAV 10-2 is deployed from MTV 2. This deployment can include UAV 10-2 separating from MTV 2 and becoming airborne within tunnel 14. The method can then advance to step 124 where UAV 10-2 executes flight movement in tunnel 14, either separately or in coordination/cooperation with the flight movement of UAV 10-1 using, in an example, the technology of swarm robotics and swarm intelligence to control the coordinated movement of UAVs 10-1 and 10-2. Once UAV 10-2 has completed executing its mission, the method can advance to step 126 wherein UAV 10-2 lands. From step 126 the method can advance to stop 122.

As can be seen, disclosed herein is a method comprising: (a) providing, on-board a mass transit vehicle (MTV) 2, at least one unmanned aerial vehicle (UAV) 10, each UAV 10 including a controller 20 comprising a processor 22 and memory 24; (b) determining, by the controller 20 of the UVA 10 while on-board the MTV 2 in a tunnel 14, at least one of the following: an acceleration, positive or negative, greater than a predetermined acceleration, an angle greater than a predetermined angle, a temperature greater than a predetermined temperature, and the presence of particles, gas or both greater than a predetermined concentration; (c) in response to the determining in step (b), the UAV 10 separating from the MTV 2 and becoming airborne within the tunnel 14; and (d), following step (c), executing, by the UAV 10, flight movement of the UAV 10 within the tunnel 14.

In the method, step (d) can include the UAV 10 executing the flight movement autonomously, under a control of an operator positioned (e.g., at OCC 56) outside the tunnel 14, or partially autonomously and partially under the control of the operator positioned 56 outside the tunnel 14.

Step (c) can include the UAV 14 becoming airborne autonomously or in response to a remotely initiated command.

The tunnel 14 can include a local wireless system 18 configured to output wireless signals 58. The UAV 10 can include a sensor 32/40 for receiving the wireless signals 58 output by the local wireless system and the controller 20 can be configured to process the received wireless signals 58 to: determine a spatial position of the UAV 10 in the tunnel 14, to control the flight movement of the UAV 10 in the tunnel 14, or both.

The wireless signals 58 can include one of the following: radio signals, infrared signals, or ultrasound signals; and the sensor 32/40 can include an antenna 40, an infrared detector 46, or an ultrasound detector 48 for receiving the respective radio signals, infrared signals, or ultrasound signals.

Controlling the flight movement of the UAV 10 in the tunnel 14 can include positioning the UAV 10 proximate an entrance 60 or exit 62 of the tunnel.

The UVA 10 can include, coupled to the controller 20, one or more accelerometers 50, each accelerometer 50 configured to output a signal corresponding to the change in the acceleration, the angle, or both; and the controller 20 can be configured to determine, based on the signal output by each accelerometer 50 and one or more values stored in the memory 24 corresponding to the predetermined acceleration, the predetermined angle, or both, the presence of the acceleration greater than the predetermined acceleration, the presence of the angle greater than the predetermined angle, or both.

Step (d) can include the UAV 10 executing the flight movement in response to commands for flight movement received by the UAV 10 from one or more antennas 64 positioned in the tunnel 14.

The UAV 10 can include at least one of the following: (i) one or more cameras 26, wherein for each camera 26 the UAV 10 the controller 20 can be configured to output via an antenna 40 of the UAV to the one or more antennas 64 positioned in the tunnel 14, a stream of video images acquired by the camera 26; (ii) a radar system 28 configured to output to the controller 20 an indication of a presence of an object; (iii) an audio speaker 38 coupled to the controller 20, the controller 20 configured to cause the audio speaker 38 to output an audio signal in response to receiving audio data from the one or more antennas 64 positioned in the tunnel 14 via the antenna 40 of the UAV; and (iv) a light 34, wherein the controller 20 can be configured to control the on-off state of the light 34.

The audio signal can include an audio sound (e.g., a beep) or message (e.g., "exit and move to the right"). The light 34 can be an LED.

The controller 20 can be configured to output via the antenna 40 of the UAV 10 to the one or more antennas 64 positioned in the tunnel 14 the indication of the presence of the object.

The indication of the presence of the object can be output in real-time.

The one or more cameras 26 can include at least one of the following: an optical video camera configured to output the stream video images in a human visual spectrum; and a thermal video camera configured to output the stream video images in an infrared spectrum.

Each stream of video images can be output in real-time.

The UAV 10 can include at least one of the following: one or more accelerometers 50 configured to detect the acceleration, the angle, or both; a temperature sensor 52 configured to detect temperature; and a smoke detector 54 configured to detect the presence of particles, gas or both greater than the predetermined concentration.

The MTV 2 can include a plurality of UAVs 10-1 and 10-2; and the plurality of UAVs can be configured to execute flight movements in coordination autonomously, or under the control of an operator positioned outside the tunnel, or partially autonomously and partially under the control of the operator positioned outside the tunnel.

The method can further include: (e), following step (d), positioning the at least one UAV 10 proximate a door 68 of the MTV 2; and (f), following step (e), and while the at least one UAV 10 is positioned proximate the door 68 of the MTV 2, outputting, by the UAV 10, at least one of the following: an audio signal, an audio message, and visible light.

The method can further include: (e), following step (d), positioning the at least one UAV 10 proximate an entrance 60 or exit 62 of the tunnel 14; and (f), following step (e), and while the at least one UAV 10 is positioned proximate the entrance 60 or exit 62 of the tunnel 14, outputting, by the UAV 10, at least one of the following: an audio signal, an audio message, and visible light.

In step (a), each UAV 10 can be provided on a vehicle (or car) 4 of the MTV 2 between the first 4-1 and last vehicle 4-5 of the MTV 2.

The UAV 10 can be a copter UAV.

Finally, step (b) can further include determining the presence of a signal initiated manually, e.g., by a passenger of the MTV.

As can be seen, wireless system 18 can operate as a communication system between OCC 56 and each UAV 10. Wireless system 18 can also operate as local positioning system to output local positioning signals that include embedded local position data that can be used by the controller of each UAV as an aid to determining the position of the UAV in the tunnel.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method comprising:
   (a) determining a mass transit vehicle (MTV) and at least one unmanned aerial vehicle (UAV) provided on-board the MTV are in a tunnel, each UAV including a controller comprising a processor and memory;
   (b) determining, by the controller of the UVA while on-board the MTV in the tunnel, at least one of the following:
      an acceleration, positive or negative, greater than a predetermined acceleration,
      an angle, positive or negative, greater than a predetermined angle,
      a temperature greater than a predetermined temperature, and
      the presence of particles, gas or both greater than a predetermined concentration;
   (c) in response to the determining in step (b), the UAV separating from the MTV and becoming airborne within the tunnel; and
   (d) following step (c), executing, by the UAV, flight movement of the UAV within the tunnel.

2. The method of claim 1, wherein step (d) includes the UAV executing the flight movement autonomously, under a control of an operator positioned outside the tunnel, or partially autonomously and partially under the control of the operator positioned outside the tunnel.

3. The method of claim 1, wherein step (c) includes the UAV becoming airborne autonomously or in response to a remotely initiated command.

4. The method of claim 1, wherein:
   the tunnel includes a local wireless system configured to output wireless signals; and
   the UAV includes a sensor for receiving the wireless signals output by the local wireless system and the controller is configured to process the received wireless signals to: determine a spatial position of the UAV in the tunnel, to control the flight movement of the UAV in the tunnel, or both.

5. The method of claim 4, wherein:
   the wireless signals comprise one of the following: radio signals, infrared signals, or ultrasound signals; and
   the sensor includes an antenna, an infrared detector, or an ultrasound detector for receiving the respective radio signals, infrared signals, or ultrasound signals.

6. The method of claim 4, wherein controlling the flight movement of the UAV in the tunnel includes positioning the UAV proximate an entrance or exit of the tunnel.

7. The method of claim 1, wherein:
   the UVA includes, coupled to the controller, one or more accelerometers, each accelerometer configured to output a signal corresponding to the acceleration, the angle, or both; and
   the controller is configured to determine, based on the signal output by each accelerometer and one or more values stored in the memory corresponding to the predetermined acceleration, the predetermined angle, or both, the presence of the acceleration greater than the predetermined acceleration, the presence of the angle greater than the predetermined angle, or both.

8. The method of claim 1, wherein step (d) includes the UAV executing the flight movement in response to commands for flight movement received by the UAV from one or more antennas positioned in the tunnel.

9. The method of claim 8, wherein the UAV includes at least one of the following:
   (i) one or more cameras, wherein for each camera of the UAV, the controller is configured to output via an antenna of the UAV to the one or more antennas positioned in the tunnel, a stream of video images acquired by the camera;
   (ii) a radar system configured to output to the controller an indication of a presence of an object;
   (iii) an audio speaker coupled to the controller, the controller configured to cause the audio speaker to output an audio signal in response to receiving audio data from the one or more antennas positioned in the tunnel via the antenna of the UAV; and
   (iv) a light, wherein the controller is configured to control the on-off state of the light.

10. The method of claim 9, wherein the audio signal is an audio message.

11. The method of claim 9, wherein the light is an LED.

12. The method of claim 9, wherein the controller is configured to output via the antenna of the UAV to the one or more antennas positioned in the tunnel the indication of the presence of the object.

13. The method of claim 12, wherein the indication of the presence of the object is output in real-time.

14. The method of claim 9, wherein the one or more cameras include at least one of the following:
- an optical video camera configured to output the stream of video images in a human visual spectrum; and
- a thermal video camera configured to output the stream of video images in an infrared spectrum.

15. The method of claim 14, wherein each stream of video images is output in real-time.

16. The method of claim 1, wherein the UAV includes at least one of the following:
- one or more accelerometers configured to detect the acceleration, the angle, or both;
- a temperature sensor configured to detect temperature; and
- a smoke detector configured to detect the presence of particles, gas or both greater than the predetermined concentration.

17. The method of claim 1, wherein:
the MTV includes a plurality of UAVs; and
the plurality of UAVs is configured to execute flight movements in coordination autonomously, or under control of an operator positioned outside the tunnel, or partially autonomously, or partially under the control of the operator positioned outside the tunnel.

18. The method of claim 1, further including:
(e) following step (d), positioning the at least one UAV proximate a door of the MTV; and
(f) following step (e), and while the at least one UAV is positioned proximate the door of the MTV, outputting, by the UAV, at least one of the following: an audio signal, an audio message, and visible light.

19. The method of claim 1, further including:
(e) following step (d), positioning the at least one UAV proximate an entrance or exit of the tunnel; and
(f) following step (e), and while the at least one UAV is positioned proximate the entrance or exit of the tunnel, outputting, by the UAV, at least one of the following: an audio signal, an audio message, and visible light.

20. The method of claim 1, wherein, in step (a), each UAV is included on a vehicle of the MTV between the first and last vehicle of the MTV.

21. The method of claim 1, wherein the UAV is a copter UAV.

22. The method of claim 1, wherein step (b) further includes determining the presence of a signal initiated manually.

* * * * *